United States Patent

Park et al.

[11] Patent Number: 5,919,281
[45] Date of Patent: Jul. 6, 1999

[54] 2-STAGE FLUIDIZED BED FURNACE FOR PRE-REDUCING FINE IRON ORE AND METHOD FOR PRE-REDUCING FINE IRON ORE USING THE FURNACE

[75] Inventors: Dae Gyu Park; Suk In Park; Il Ock Lee, all of Pohang, Rep. of Korea

[73] Assignees: Pohang Iron & Steel Co., Ltd.; Research Institute of Industrial Science & Technology, both of Rep. of Korea; Voest-Alpine Industrieanlagenbau GmbH, Austria

[21] Appl. No.: 08/894,670

[22] PCT Filed: Dec. 26, 1996

[86] PCT No.: PCT/KR96/00249

§ 371 Date: Aug. 25, 1997

§ 102(e) Date: Aug. 25, 1997

[87] PCT Pub. No.: WO97/23655

PCT Pub. Date: Jul. 3, 1997

[30] Foreign Application Priority Data

Dec. 26, 1995 [KR] Rep. of Korea ............ 95/56690

[51] Int. Cl.[6] .................................................. C21B 13/14
[52] U.S. Cl. ............................................. 75/450; 266/172
[58] Field of Search ........................... 266/172, 156, 266/142; 75/444, 450

[56] References Cited

U.S. PATENT DOCUMENTS 4,359,212  11/1982  Bengtsson et al. ............. 266/172
4,886,246  12/1989  Maeda et al. ................... 266/157
5,185,032   2/1993  Whipp ............................. 266/172
5,534,046   7/1996  Kepplinger et al. .............. 75/446
5,535,991   7/1996  Kepplinger et al. ............. 266/160
5,584,910  12/1996  Kepplinger et al. .............. 75/445
5,785,733   7/1998  Lee et al. .......................... 75/444

FOREIGN PATENT DOCUMENTS 94-1137  2/1994  Rep. of Korea .
94-1138  2/1994  Rep. of Korea .

*Primary Examiner*—Scott Kastler
*Attorney, Agent, or Firm*—Webb Ziesenheim Bruening Logsdon Orkin & Hanson, P.C.

[57] ABSTRACT

The 2-stage fluidized bed furnace for pre-reducing a fine iron ore comprises a first stage fluidized bed furnace for receiving the fine iron ore from a storage hopper, discharging medium/small particle size iron ore to the upper part thereof, and reducing a coarse particle size iron ore while forming a bubbling fluidized bed; a second stage fluidized bed furnace for receiving the medium/small particle size iron ore discharged from the upper part of the first stage and reducing it while forming a turbulent fluidized bed; and a first hot cyclone for collecting the small particle size iron ore contained in the discharged gas from the second stage fluidized bed furnace, the first stage furnace being formed in an upper-narrowed, lower-expanded shape and comprising a narrow, upper portion, a transitional, slanted portion and a wide, lower portion, the second stage furnace being in an upper-expanded, lower-narrowed shape and comprising a wide, upper portion, a transitional, slanted portion and a narrow, lower portion.

13 Claims, 2 Drawing Sheets

2-STAGE FLUIDIZED BED FURNACE FOR PRE-REDUCING FINE IRON ORE AND METHOD FOR PRE-REDUCING FINE IRON ORE USING THE FURNACE

BACKGROUND OF THE INVENTION

1. Field of the Invention

The present invention relates to a pre-reduction furnace for pre-reducing fine iron ore having a wide particle size distribution in a smelting reduction process for producing molten pig iron directly from iron ore and coal, without the need for sintering machines and coke ovens. More particularly, the present invention relates to a 2-stage fluidized bed furnace for pre-reducing fine iron ore which includes a high content of fine particle size ore which is readily decomposed by reaction heat at a pre-reduction temperature and a method for pre-reducing fine iron ore using the pre-reduction furnace.

2. Description of the Prior Art

Generally, methods of reducing iron ore to produce a molten iron include a blast furnace, a direct reduction process by which reduced iron is obtained in a solid form by using a shaft furnace, a rotary kiln and a fluidized bed furnace, as well as other methods using an electric furnace.

The blast furnace is the prevailing iron-making method at the present time. The blast furnace is charged with sintered ore, including fine iron ore, and large amounts of coke, using high quality coking coal as a heat source and as a reducing agent, so as to improve the permeability and reducibility of the iron ore at the shaft portion of the blast furnace.

The blast furnace iron making process has serious drawbacks, such as the immense facility investment, the lack in flexibility of operation due to high tonnage mass production, and the industrial pollution of the environment from the pre-treatment facilities. These problems are caused by the coke ovens required for distilling the coking coal and the facilities needed for manufacturing the sintered iron ore.

A direct reduction process by which iron is obtained by using a high-quality iron ore and a reducing gas from a nature gas has been limitedly employed in geographical areas that can be economically supplied with high quality iron ore and natural gas.

The quantity of crude steel production in the world is relatively low. However, the production of crude steel is gradually increasing, caused by the increasing demand for various kinds of structural steels, as well as by the deterioration in the quality of available scrap.

However, the above method is used through pre-treatments such as pelletizing and sintering to increase permeability when iron ore is charged in a furnace. This is very important in attaining a normal operation. In the case of a smelting reduction process which makes molten iron by directly using fine iron ore of the type having largely varying grain sizes without pre-treatment using coal, the above method has importance as a new method of producing iron capable of replacing a blast furnace. The smelting reduction method has been studied as a means for charging conventional iron ore in a simple reactor and reducing it after directly melting it. Recently, however, a smelting reduction process has been developed for charging iron ore in a melting furnace after pre-reducing a proper quantity in a solid state and finally reducing it. This approach is practical and energy efficient.

It is of interest to develop a technique employing a fluidized bed pre-reduction furnace which fluidizes fine iron ore by using an off-gas from a smelting reduction furnace supplied to the fluidized bed reduction furnace, which is known as a method of processing fine iron ores for pre-reduction of this process.

In a conventional fluidized bed direct reduction process related to such techniques, it is practical to use special fine particle size iron ore in which the particle size distribution is narrow. A fluidized bed reduction process using fine iron ores having a wide distribution of particle size (i.e., pre-reduction step of a smelting reduction process producing molten iron using coal as a heat source and as a reducing agent and iron ores without pre-treatment) has recently been developed but is not yet practical because of technical difficulties encountered. In a known smelting reduction process producing molten iron which directly uses fine iron ore and coal without pre-treatment, the smelting reduction comprises a smelting reduction furnace and a pre-reduction furnace as depicted in FIG. 1. The smelting reducing furnace generates pre-reduction gas by a gasification reaction of the charged coal and then supplies the pre-reduction gas to the pre-reduction furnace through a gas duct after collection of dust in a hot cyclone. The pre-reduction gas pre-reduces the iron ore charged in the pre-reduction furnace to a high degree by using a reducing force and heat provided by an off-gas of the smelting reduction furnace. Pre-reduced iron ore, which is charged in the smelting reduction furnace, is converted into molten metal by finally being reduced in the molten state.

A method of reducing fine iron ores which have a wide particle size distribution by a fluidized bed pre-reduction process is shown in FIG. 2 involving a circulating fluidized bed pre-reduction process in which coarse particle size iron ore is reduced by fluidization in the lower zone thereof, and small particle size iron ore is discharged by elutriating through a freeboard area of the top of the furnace. The ore fines are then collected in a hot cyclone and a portion of the reducing gas supplied to the hot cyclone is fed into a fluidized bed formed in the lower zone through a down-comer. However, it is not easy to control the state of fluidization of charging materials having different fractions of grain sizes.

To operate the fluidized bed with fractions of different grain sizes, it is necessary to form a base of coarse particle size iron ore in the lower bed layer. The fluidization velocity causes discharge by segregation of medium and small particle size ore with coarse particle size ore, and it raises a problem of ore collection due to a deterioration in the collection efficiency of the cyclone fixed at the rear stage.

In FIG. 2, reference numbers 1, 2 and 3 indicate, respectively, a pre-reduction furnace, a hot cyclone, and a gas distributing plate fixed in the pre-reduction furnace.

As described above, to solve the problem in a conventional fluidized reduction furnace using fine iron ore which has a wide particle size distribution, a circulating fluidized bed pre-reduction furnace for pre-reducing fine iron ores composed of 2-stage fluidized bed furnaces is disclosed in Korean patent publication Nos. 94-1137 and 94-1138. In the process of the fluidized bed furnace, if an iron ore burden having a wide particle size distribution is charged in a first fluidized bed reduction furnace, medium and small particle size ore is separately supplied to a second fluidized bed furnace by a fluidizing gas. The coarse particle size ore is stably reduced by fluidizing in the first fluidized bed pre-reduction furnace, and the medium and small particle size ore is reduced in the second fluidized bed pre-reduction furnace, under a different particle size distribution.

Fine iron ore having a wide particle size distribution is reduced in a fluidized state by continuously charging the fine ore in the first fluidized bed reduction furnace. In the process using a 2-stage fluidized bed furnace, a gas fluidizing velocity for the fluidized bed should be operated on a basis of a large particle size ore.

Accordingly, in the case of the circulating fluidized bed pre-reduction furnace for pre-reducing fine particle size iron ore, a large quantity of coarse particle size iron ore can be transferred to the top of the first fluidized bed reduction furnace by elutriating with the small particle size ore. There is, however, a problem that deteriorates fluidization of the fine particle size iron ore in the second fluidized bed reduction furnace due to presence of the coarse particle size iron ore.

Furthermore, in the case of a fluidized bed reduction furnace having two reactors, the reducing gas supplied to the first fluidized bed reduction furnace has a problem that deteriorates the reducing force of the fluidizing gas in the second fluidized bed stage. The gas being supplied to the second fluidized bed reduction furnace is oxidizing to a high degree, because the coarse particle size ore is reduced by fluidizing while the small particle size ore is supplied separately to the second fluidized bed reduction furnace.

The present inventor has studied these various problems arising in the conventional method described above and, as a result, has conceived the present invention.

SUMMARY OF THE INVENTION

The object of the present invention is to provide a 2-stage fluidized bed pre-reduction furnace for processing fine iron ore which can prevent elutriating medium/small particle size ore as well as improve the efficiency of segregation and a method for pre-reducing fine particle size iron ore. A first stage fluidized bed reduction furnace is formed in an upper-narrowed, lower-expanded shape, and a second stage fluidized bed reduction furnace is formed in an upper-expanded, lower-narrowed shape.

To achieve these and other advantages and in accordance with the purpose of the present invention as embodied and described herein, a 2-stage fluidized bed furnace for pre-reducing a fine iron ore having a wide particle size distribution according to the present invention comprises:

a first stage fluidized bed reduction furnace for receiving the fine iron ore from an iron ore storage hopper, discharging by elutriating a medium/small particle size iron ore fraction to the upper portion thereof and reducing a coarse particle size iron ore fraction while forming a bubbling fluidized bed in the lower portion thereof;

a second stage fluidized bed reduction furnace for receiving medium/small particle size iron ore discharged by elutriating from the upper part of the first stage fluidized bed reduction furnace and reducing it while forming a turbulent fluidized bed; and a first hot cyclone for collecting the small particle size iron ore contained in the discharged gas from the second stage fluidized bed reduction furnace.

Further, the present invention relates to a method for pre-reducing the fine particle size iron ore using the above-described apparatus.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 3:
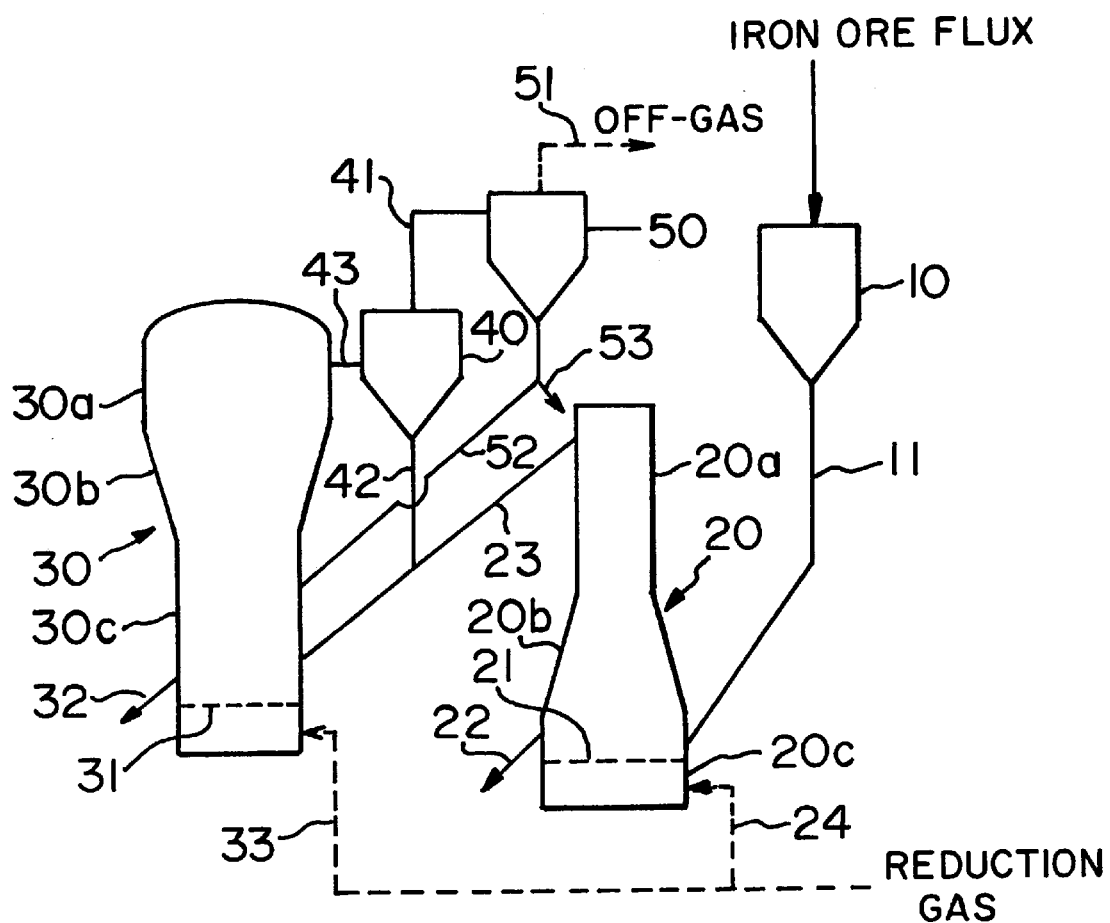
FIG. 3 is a schematic diagram of a 2-stage fluidized bed pre-reduction furnace for processing fine iron ore according to the present invention.

Referring to FIG. 3, a 2-stage fluidized bed pre-reduction furnace according to the invention comprises:

a first stage fluidized bed reduction furnace 20 for receiving the fine particle size iron ore from an iron ore storage hopper 10. The ore is discharged by elutriating a medium/small particle size iron ore to the upper portion thereof and reduces a coarse particle size iron ore fraction while forming a bubbling fluidizing bed therein. A second stage fluidizing bed reduction furnace 30 receives the medium/small particle size ore discharged by elutriating from the upper part of the first stage fluidized bed reduction furnace 20 and reduces it while forming a turbulent fluidized bed therein. A first hot cyclone 40 collects the small particle size iron ore contained in the discharged gas from the second stage fluidized bed reduction furnace 30.

The first stage fluidized bed reduction furnace 20 is configured in an upper-narrowed, lower-expanded shape and comprises a narrow upper portion 20a, a slanted portion 20b and a wide, lower portion 20c. A first gas distribution plate 21 is installed in the wide lower portion 20c of the first fluidized bed reduction furnace 20. The side wall of the wide, lower portion 20c is connected to the iron ore storage hopper 10 via an ore feed tube 11 for supplying the iron ore stored in the hopper 10 into the furnace 20. Also, a first reduced gas inlet tube 24 for introducing a reducing gas into the first stage furnace 20 and a coarse particle ore outlet tube 22 for discharging the pre-reduced coarse particle size ore are connected to the side wall of the wide lower portion 20c. Further, a first medium/small particle size iron ore outlet tube 23 is connected to the upper side wall of said narrow upper portion 20a to discharge the medium/small particle size iron ore in said second stage fluidized bed furnace 30.

The second stage fluidized bed reduction furnace 30 is formed in an upper-expanded, lower-narrowed shape and comprises a wide upper portion 30a, a slanted portion 30b and a narrow, lower portion 30c. A second gas distribution plate 31 is installed in the narrow, lower portion 30c. The side wall of the narrow, lower portion 30c is connected to the first stage fluidized bed reduction furnace 20 via a first medium/small particle size ore outlet tube 23 for introducing the medium/small particle size ore discharged form the first furnace 20 and the small particle size ore collected in the first hot cyclone 40. Further, a second reducing gas inlet tube 33 for introducing the reduced gas into the furnace 30 and a second medium/small particle size ore outlet tube 32 for discharging the pre-reduced medium/small particle size ore are connected to the side wall of the narrow, lower portion 30c.

Still referring to FIG. 3, the wide upper portion 30a of the second stage fluidized bed reduction furnace 30 is connected to a first hot cyclone 40 via a third gas outlet tube 43. The bottom of the first hot cyclone 40 is connected to the first medium/small particle size ore outlet tube 23 through a first small particle size ore feed tube 42 for circulating the small particle size ore contained in the discharged gas of the second stage fluidized bed reduction furnace 30 back to the furnace 30. A first gas outlet tube 41 for discharging the gas separated from the small particle size ore is connected to the top of the first hot cyclone 40. The first small particle size ore feed tube 42 is connected to the first medium/small particle size ore outlet tube 23.

Preferably, the present invention further comprises a second hot cyclone 50 for collecting a fine particle size iron ore contained in a discharged gas from the first hot cyclone 40. The bottom of the second hot cyclone is connected to the narrow, lower portion 30c of the second stage fluidized bed reduction furnace 30 via a second small particle ore feed tube 52. Further, a second gas outlet tube 51 for discharging the gas separated from the small particle size ore is connected to the top of the second hot cyclone 50. A fine particle size, reduced iron ore outlet tube 53 for discharging a reduced, fine particle size iron ore is preferably connected to the second small particle size ore feed tube 52. If the second hot cyclone 50 is not provided, it is desirable to connect the fine particle size, reduced iron ore outlet tube 53 to the first small particle size ore feed tube 42.

Meanwhile, in the first stage fluidized bed reduction furnace 20, the dimension of the inner diameter of the narrow, upper portion 20a is preferably 0.8–0.9 times the diameter of the wide, lower portion 20c. The slanted portion 20b preferably has a slant angle of 8–10 degrees.

In the second stage fluidized bed reduction furnace 30, the dimension of the inner diameter of the wide, upper portion 30a is preferably 1.5–1.8 times as large as the diameter of the narrow, lower portion 30c. The slanted portion 30b preferably has a slant angle of 8–10 degrees.

The small particle size iron ore discharged from the second stage fluidized bed reduction furnace 30, together with the gas, is collected in the first hot cyclone 40 and then recirculated to the second stage fluidized bed reduction furnace 30. A part of the small particle size iron ore collected in the first hot cyclone 40 is discharged to the outside via the fine particle size, reduced iron ore outlet tube 53. If the furnace has the second hot cyclone 50, the small particle size iron ore contained in the gas discharged from the first hot cyclone 40 is collected in the second hot cyclone 50 and then recirculated to the second stage fluidized bed reduction furnace 30. A part of the small particle size iron ore collected in the second hot cyclone 50 is discharged to the outside via the fine particle size, reduced iron ore outlet tube 53.

It is preferable that coarse particle size, reduced iron ore of more than 0.5 mm is discharged through the coarse particle size ore outlet tube 22, medium/small particle size, reduced iron ore of less than 0.5 mm is discharged through the second medium/small particle size ore outlet tube 32, and small particle size, reduced iron ore of less than 0.125 mm is discharged through the fine particle size, reduced iron ore outlet tube 53.

When a fine particle size iron ore is introduced into the first stage fluidized bed reduction furnace 20, the fine particle size iron ore in the furnace forms a fluidized bed in one of a variety of forms according to the velocity of the fluidizing gas. If a reducing gas is supplied through the first gas distribution plate 21 at a fluidizing velocity lower than that of the coarse particle size iron ore, the coarse particle size iron ore forms a dense phase in the lower part of the fluidized bed reduction furnace, the small particle size iron ore forms a dilute phase in the upper part of the furnace and is separated to a second stage fluidized bed reduction furnace 30 via the first medium/small particle size ore outlet tube 23. Under this process condition, the medium particle size iron ore accumulates in the first furnace 20 between the top of the coarse particle size ores and the portion to which the first medium/small particle size ores outlet tube 23 is connected.

Figure 1:
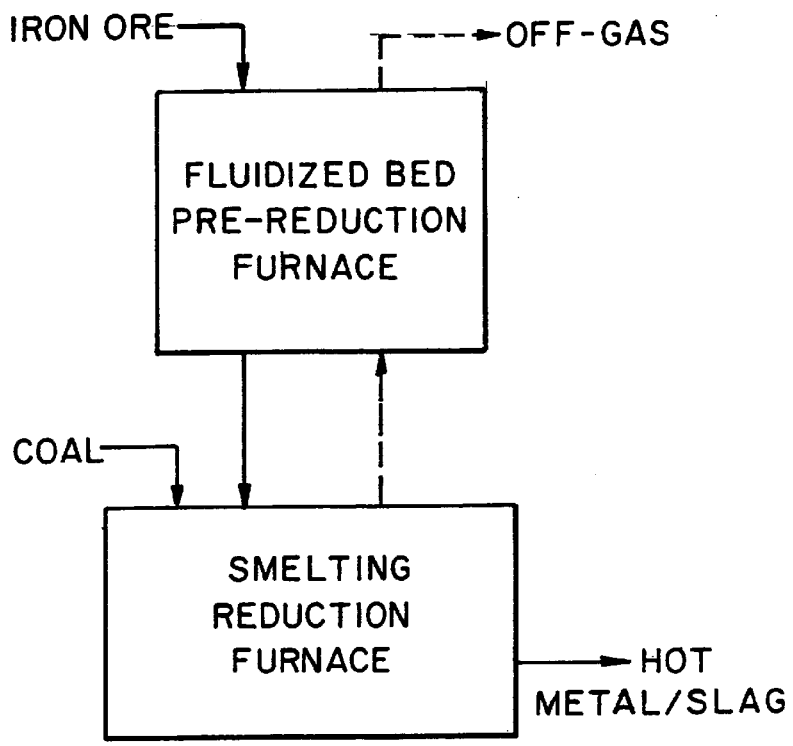
FIG. 1 is a schematic view of a conventional smelting reduction process for producing molten iron.
Figure 2:
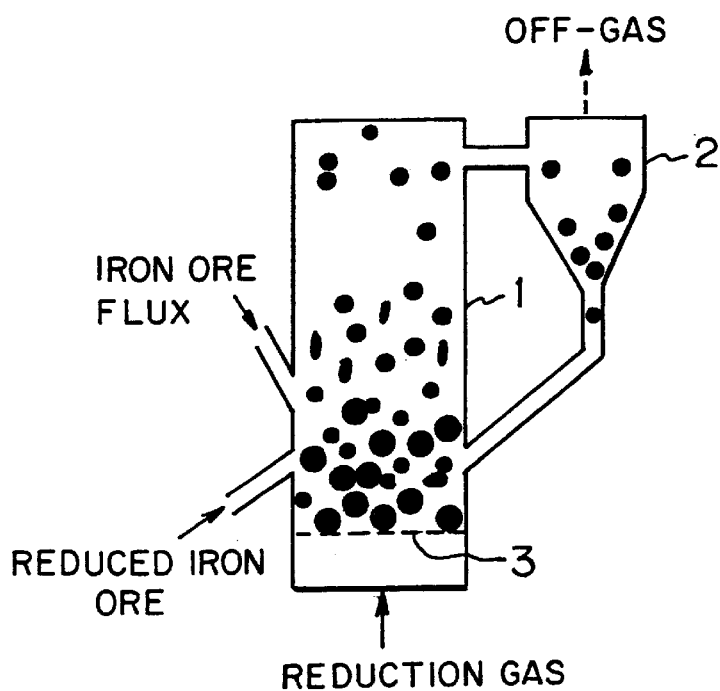
FIG. 2 is a schematic diagram of a conventional fluidized bed pre-reduction furnace for processing a fine iron ore.

In the conventional first fluidized bed furnace of FIG. 2, the reaction furnace has a cylindrical structure of uniform diameter, and therefore the superficial velocity of the reducing gas in a vertical direction is constant. Thus, the medium particle size iron ore remaining between the top of the dense phase of coarse particle size ore and the dilute phase of the small particle size ore may accumulate without being discharged to outside.

To the contrary, the present invention prevents the coarse particle size ore from being discharged to the second stage fluidized bed reduction furnace 30 together with the small particle size ore by decreasing the relative fluidizing velocity of the first stage fluidized bed reduction furnace 20.

Further, in the first stage fluidized bed reduction furnace 20 according to the present invention, the gas fluidizing velocity to the upper part of the coarse particle size, dense phase is increased by providing a slanted portion 20b between the narrow, upper portion 20a and the wide, lower portion 20c of the first stage fluidized bed reduction furnace 20 so as to make the dimension of the upper part of the coarse particle size, dense phase to be narrower than the lower part thereof, thereby improving the separating efficiency of the medium particle size iron ore remaining in the upper and middle regions of the first stage bed reduction furnace 20.

Therefore, in the present invention, the first and second stage fluidized bed furnaces 20,30 provide an optimum condition of fluidized bed reduction for the medium/small particle size iron ore.

In the present invention, the lower superficial velocity of the first stage fluidized bed reduction furnace 20 is preferably 2.0–2.5 m/sec and that of the second stage fluidized bed reduction furnace 30 is preferably 0.2–0.5 m/sec.

The present invention will now be described on the basis of an actual example.

EXAMPLE

A reduction furnace as depicted in FIG. 3 was constructed. A fine particle size iron ore having a wide particle size distribution, with a particle size of −10 mm, was charged into the first stage fluidized bed reduction furnace 20. A reducing gas of about 3 Kgf/cm$^2$ and 850° C. was supplied in the first stage and second stage fluidized bed reduction furnaces 20 and 30, respectively, via the gas distribution plates 21, 31 of the first stage and the second stage fluidized bed reduction furnaces from the reducing gas feed tubes 24, 33 so as to reduce the fine iron ore. The coarse particle size reduced iron ore was then discharged from the coarse particle size iron ore outlet tube 22 of the first stage fluidized bed reduction furnace 20, the medium/small particle size iron ore was discharged from the medium/small particle size iron ore outlet tube 32 of the second stage fluidized bed reduction furnace 30, and the fine particle size reduced iron ore was discharged from the second small particle size iron ore feed tube 52 of the second hot cyclone 50 via the reduced iron ore outlet tube 53.

The present embodiment employed the following described experimental device and process conditions:

(1) Iron ore source (a) composition: T.Fe 62.5%, FeO 0.51%, $SiO_2$ 5.22%, $Al_2O_3$ 2.54%, S 0.012%, and P 0.067%

(b) particle size distribution

| particle size (mm) | +5 | 1–5 | 0.5–1 | 0.25–0.5 | 0.25–1.25 | –0.125 |
|---|---|---|---|---|---|---|
| fraction (wt %) | 12 | 42.5 | 10.2 | 10.1 | 10.2 | 15.0 |

(c) charged amounts: 6.5 Kg/min.

(2) Reducing gas: removing $CO_2$ contained in by-product gas produced in an iron and steel works by using an absorption tower, adding hydrogen, heating with an electric heater, and supplying.

(a) gas composition: CO 65%, $H_2$ 25%, $CO_2$ 5%, $H_2O$ 5;

(b) temperature and pressure: about 850° C., 3 $Kgf/cm^2$.

(3) Processing conditions of fluidized bed reduction furnace (a) The sizes of facilities in fluidized bed reduction furnace were as follows:

inner diameter of the lower portion of first stage fluidized bed furnace: 0.20 m height of the lower portion of first stage fluidized bed furnace (height from distribution plate to the upper end of slanted portion): 2.00 mm inner diameter of the upper portion of first stage fluidized bed furnace: 0.17 m height of the upper portion of first stage fluidized bed furnace: 4.00 m inner diameter of lower portion of second stage fluidized bed furnace: 0.50 m height of the lower portion of second stage fluidized bed furnace (height from gas distribution plate to the lower end of slanted portion): 4.00 m inner diameter of the upper portion of second stage fluidized bed furnace: 0.80 m height of the upper portion of second stage fluidized bed furnace: 2.50 m (b) gas fluidizing velocity in fluidized bed furnace superficial velocity of the lower portion of first stage fluidized bed furnace: 2.20 m/sec superficial velocity of the upper portion of first stage fluidized bed furnace: 3.04 m/sec superficial velocity of the lower portion of second stage fluidized bed furnace: 0.25 m/sec superficial velocity of the upper portion of second stage fluidized bed furnace: 0.28 m/sec.

(c) discharging rate of reduced iron: 5.81 kg/min lower portion of first stage fluidized bed furnace: 1.74 kg/min (reduced iron of more than 0.5 mm, about 95%)

lower portion of second stage fluidized bed furnace: 3.49 kg/min (reduced iron of less than 0.5 mm, about 90%)

lower portion of second stage cyclone: 0.58 kg/min (reduced iron of less than 0.125 mm).

As a result of the above-conditioned experiment with the fine particle size iron ore charged into the first stage fluidized bed reduction furnace 20, the discharging ratio of the reduced iron ore was 3:7 and at least about 95% of the medium particle size ore (0.25–0.5 mm) was discharged to the second fluidized bed stage reduction furnace. Therefore, in the present invention, separating efficiency was improved by more than about 20% compared with that of a conventional cylindrical furnace. The gas consumption was 1280 $Nm^3$/t-ore and the average reduction percentage was about 65%, even when the ore pre-heating step was omitted.

The present invention can reduce a fine iron ore having a wide particle size distribution without any preliminary treatment such as grinding or screening/classification. Further, in the present invention, the amount of fine iron ore reduced in the first stage fluidized bed reduction furnace is decreased and, thus, leads to a high efficiency in the reducing force of the reducing gas in the second stage fluidized bed reduction furnace, thereby improving reducing gas velocity. In addition, the pre-reduced ore can be easily introduced into a smelting reduction furnace because the pre-reduced small particle size ore, the medium/small particle size ore and the coarse particle size ore are classified during the fluidized bed reduction process and each size fraction is discharged through separate discharging tubes.

It will be apparent to those skilled in the art that various modifications and variations can be made in a 2-stage fluidized bed pre-reduction furnace of fine iron ores and to the method of the present invention without departing from the spirit or scope of the invention. Thus, it is intended that the present invention cover the modifications and this invention provided they come within the scope of the appended claims and their equivalents.

What is claimed is:

1. A 2-stage fluidized bed furnace for pre-reducing a fine iron ore, comprising:

a first stage fluidized bed furnace for receiving the fine iron ore from a fine iron ore storage hopper via an ore feed tube, means for discharging by elutriating a medium/small particle size iron ore to the upper portion thereof, and reducing a coarse particle size iron ore while forming a bubbling fluidized bed;

a second stage fluidized bed furnace for receiving the medium/small particle size iron ore discharged from the upper portion of the first stage fluidized bed reduction furnace and reducing said medium/small particle size iron ore while forming a turbulent fluidized bed; and a first hot cyclone for collecting a small particle size iron ore contained in the discharged gas from the second stage fluidized bed reduction furnace, the first stage fluidized bed reduction furnace being an upper-narrowed, lower-expanded shape and comprising a narrow, upper portion, a slanted portion and a wide, lower portion, the wide, lower portion having a first gas distribution plate therein, a first reduced gas inlet tube and a coarse particle ore outlet tube connected to the side wall of the wide, lower portion, the second stage fluidized bed reduction furnace being an upper-expanded, lower-narrowed shape and comprising a wide, upper portion, a slanted portion and a narrow, lower portion, the narrow, lower portion having a second gas distribution plate therein, a second reduced gas inlet tube and a second medium/small particle ore outlet tube connected to the side wall of the narrow, lower portion, the first stage fluidized bed reduction furnace connected to the second stage fluidized bed reduction furnace via a first medium/small particle ore outlet tube, the second stage fluidized bed reduction furnace connected to the first hot cyclone via a third gas outlet tube, the first hot cyclone having a first gas outlet tube in the upper portion thereof and a first small particle ore feed tube in the bottom thereof, the first small particle ore feed tube connected to the first medium/small particle ore outlet tube.

2. The fluidized bed furnace as claimed in claim 1, further comprising a second hot cyclone for collecting a fine particle size iron ore contained in a discharged gas from the first hot cyclone, the first hot cyclone connected to the second hot cyclone via the first gas outlet tube, the second hot cyclone connected to the second stage fluidized bed reduction furnace via a second small particle ore feed tube, and having a second gas outlet tube in the upper portion thereof.

3. The fluidized bed furnace as claimed in claim 2, wherein the second small particle ore feed tube has a reduced fine iron ore outlet tube for discharging a reduced, fine particle size iron ore.

4. The fluidized bed furnace as claimed in claim 1, wherein an inner diameter of the narrow, upper portion of the first stage fluidized bed reduction furnace is 0.8–0.9 times as large as a diameter of the wide, lower portion of the first stage fluidized bed reduction furnace, the slanted portion of the first stage fluidized bed reduction furnace has a slant angle of 8–10 degrees, an inner diameter of the wide, upper portion of the second stage fluidized bed reduction furnace is 1.5–1.8 times as large as a diameter of the narrow, lower portion of the second stage fluidized bed reduction furnace, and the slanted portion of the second stage fluidized bed reduction furnace has a slant angle of 8–10 degrees.

5. A method of pre-reducing a fine iron ore using a 2-stage fluidized bed pre-reduction furnace comprising the steps of:

dividing a fine iron ore into a medium/small particle size iron ore fraction having a particle size distribution less than 0.5 mm and a coarse particle size iron ore fraction having a particle size distribution more than 0.5 mm in a first stage fluidized bed reduction furnace;

discharging the medium/small particle size iron ore to a second stage fluidized bed reduction furnace;

pre-reducing the coarse particle size iron ore while forming a bubbling fluidized bed of a coarse particle size iron ore in the first stage fluidized bed reduction furnace; and pre-reducing the medium/small particle size iron ore while forming a turbulent fluidized bed of a medium and small particle size iron ore in the second stage fluidized bed reduction furnace.

6. The method as claimed in claim 5, wherein the medium/small particle size iron ore of less than 0.5 mm which is discharged from the first stage fluidized bed reduction furnace to the second stage fluidized bed reduction furnace is at least 90% of the medium/small particle size iron ore charged into the first stage fluidized bed reduction furnace.

7. The method as claimed in claim 6, wherein a fluidizing superficial velocity is 2.0–2.5 m/sec in the lower portion of the first stage fluidized bed reduction furnace and 0.2–0.5 m/sec in the lower portion of the second stage fluidized bed reduction furnace.

8. A method of pre-reducing a fine iron ore using a 2-stage fluidized bed pre-reduction furnace comprising the steps of:

dividing a fine iron ore into a medium/small particle size iron ore fraction having a particle size distribution less than 0.5 mm and a coarse particle size iron ore fraction having a particle size distribution more than 0.5 mm in a first stage fluidized bed reduction furnace;

discharging the medium/small particle size ore to a second stage fluidized bed reduction furnace;

pre-reducing the coarse particle size ore while forming a bubbling fluidized bed of the coarse particle ore in the first stage fluidized bed reduction;

pre-reducing the medium/small particle size ore while forming a turbulent fluidized bed of the medium/small particle size ore in the second stage fluidized bed reduction furnace; and discharging the small particle size ore of less than 0.125 mm through a reduced fine iron ore outlet tube.

9. The method as claimed in claim 8, wherein the medium/small particle size ore of less than 0.5 mm which is discharged from the first stage fluidized bed reduction furnace to the second stage fluidized bed reduction furnace is at least 90% of the medium/small particle size iron ore charged into the first stage fluidized bed reduction furnace.

10. The method as defined in claim 8, wherein the fluidizing superficial velocity is 2.0–2.5 m/sec in the lower portion of the first stage fluidized bed reduction furnace and 0.2–0.5 m/sec in the lower portion of the second stage fluidized bed reduction furnace.

11. The fluidized bed furnace as claimed in claim 2, wherein an inner diameter of the narrow, upper portion of the first stage fluidized bed reduction furnace is 0.8–0.9 times as large as a diameter of the wide, lower portion of the first stage fluidized bed reduction furnace, the slanted portion of the first stage fluidized bed reduction furnace has a slant angle of 8–10 degrees, an inner diameter of the wide, upper portion of the second stage fluidized bed reduction furnace is 1.5–1.8 times as large as a diameter of the narrow, lower portion of the second stage fluidized bed reduction furnace, and the slanted portion of the second stage fluidized bed reduction furnace has a slant angle of 8–10 degrees.

12. The fluidized bed furnace as claimed in claim 3, wherein an inner diameter of the narrow, upper portion of the first stage fluidized bed reduction furnace is 0.8–0.9 times as large as a diameter of the wide, lower portion of the first stage fluidized bed reduction furnace, the slanted portion of the first stage fluidized bed reduction furnace has a slant angle of 8–10 degrees, an inner diameter of the wide, upper portion of the second stage fluidized bed reduction furnace is 1.5–1.8 times as large as a diameter of the narrow, lower portion of the second stage fluidized bed reduction furnace, and the slanted portion of the second stage fluidized bed reduction furnace has a slant angle of 8–10 degrees.

13. The method as defined in claim 9, wherein a fluidizing superficial velocity is 2.0–2.5 m/sec in the lower portion of the first stage fluidized bed reduction furnace and 0.2–0.5 m/sec in the lower portion of the second stage fluidized bed reduction furnace.

* * * * *

UNITED STATES PATENT AND TRADEMARK OFFICE
CERTIFICATE OF CORRECTION

PATENT NO. : 5,919,281
DATED : July 6, 1999
INVENTOR(S) : Dae Gyu Park et al.

It is certified that error appears in the above-identified patent and that said Letters Patent is hereby corrected as shown below:

Column 7 Line 20 between "5" and ";" insert --%--.

Signed and Sealed this

Twenty-eighth Day of December, 1999

Attest:

Attesting Officer

Q. TODD DICKINSON

Acting Commissioner of Patents and Trademarks